(12) United States Patent
Yahiaoui et al.

(10) Patent No.: US 6,355,583 B1
(45) Date of Patent: Mar. 12, 2002

(54) MULTI-FUNCTIONAL SORBENT MATERIAL

(75) Inventors: Ali Yahiaoui, Roswell; Gabriel Hamman Adam, Alpharetta, both of GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 0 days.

(21) Appl. No.: 09/320,034

(22) Filed: May 26, 1999

Related U.S. Application Data

(60) Provisional application No. 60/087,384, filed on May 30, 1998.

(51) Int. Cl.$^7$ ............................................. B32B 27/04
(52) U.S. Cl. .................... 442/110; 442/118; 442/121; 428/306.6; 510/422; 510/438
(58) Field of Search .................... 442/118, 121, 442/110, 116; 428/306.6; 510/422, 438

(56) References Cited

U.S. PATENT DOCUMENTS

| | | | |
|---|---|---|---|
| 2,969,332 A | 1/1961 | Lawler et al. ............... 252/354 |
| 3,167,514 A | 1/1965 | Baker ......................... 252/170 |
| 3,959,421 A | 5/1976 | Weber et al. ................... 265/6 |
| 4,041,203 A | 8/1977 | Brock et al. ................ 428/157 |
| 4,096,311 A | 6/1978 | Pietreniak ................... 428/289 |
| 4,302,366 A | 11/1981 | Perronin et al. ........... 252/8.57 |
| 4,328,279 A | 5/1982 | Meitner et al. ............. 428/289 |
| 4,434,087 A | 2/1984 | Hampson et al. .......... 252/545 |
| 4,464,293 A | 8/1984 | Dobrin ....................... 252/547 |
| 4,468,428 A | 8/1984 | Early et al. ................. 428/221 |
| 4,478,853 A | 10/1984 | Chaussee .................... 424/358 |
| 4,609,580 A | 9/1986 | Rockett et al. ............. 428/198 |
| 4,622,258 A | 11/1986 | Mencke ....................... 428/171 |
| 4,627,931 A | 12/1986 | Malik .......................... 252/153 |
| 4,627,936 A | 12/1986 | Gould et al. ................ 252/558 |
| 4,650,479 A | 3/1987 | Insley ......................... 604/358 |
| 4,678,698 A | 7/1987 | Mencke ....................... 428/171 |
| 4,839,098 A | 6/1989 | Wisotzki et al. ............ 252/557 |
| 4,904,521 A | 2/1990 | Johnson et al. ............. 428/284 |
| 4,904,524 A | 2/1990 | Yoh ......................... 428/311.3 |
| 4,938,888 A | 7/1990 | Kiefer et al. .................. 252/91 |
| 4,940,626 A | 7/1990 | Rhodes, III et al. ........ 428/198 |
| 4,956,170 A | 9/1990 | Lee .............................. 424/81 |
| 5,015,414 A | 5/1991 | Kamegai et al. ............ 252/545 |
| 5,041,275 A | 8/1991 | Miller ......................... 423/269 |
| 5,094,770 A | 3/1992 | Sheridan et al. .............. 252/91 |
| 5,167,950 A | 12/1992 | Lins ............................. 424/47 |
| 5,173,356 A | 12/1992 | Eaton et al. ................. 428/219 |
| 5,223,319 A | 6/1993 | Cotton et al. ............... 428/131 |
| 5,279,667 A | 1/1994 | Das ............................... 134/3 |
| 5,281,463 A | 1/1994 | Cotton ........................ 428/126 |
| 5,288,486 A | 2/1994 | White ...................... 424/78.08 |
| 5,302,249 A | 4/1994 | Malhotra et al. ........... 162/135 |
| 5,362,832 A | 11/1994 | Cook ........................... 526/333 |
| 5,370,816 A | 12/1994 | Balzer et al. ................ 252/132 |
| 5,376,366 A | 12/1994 | Petchul et al. ........... 4524/78.07 |
| 5,385,750 A | 1/1995 | Aleksejczyk et al. .......... 427/4 |
| 5,405,602 A | 4/1995 | Simmons et al. ............. 424/47 |
| 5,418,045 A | 5/1995 | Pike et al. ................... 428/198 |
| 5,453,540 A | 9/1995 | Dams et al. ................... 564/96 |
| 5,508,029 A | 4/1996 | Petchul et al. ........... 424/78.07 |
| 5,540,979 A | 7/1996 | Yahiaoui et al. ............ 428/212 |
| 5,545,481 A | 8/1996 | Harrington ................. 428/378 |
| 5,582,907 A | 12/1996 | Pall ............................. 428/287 |
| 5,591,442 A | 1/1997 | Diehl et al. ................. 424/401 |
| 5,609,587 A | 3/1997 | Roe ............................ 604/360 |
| 5,624,676 A | 4/1997 | Mackey et al. ............. 424/414 |
| 5,629,006 A | 5/1997 | Hoang et al. ............... 424/405 |
| 5,639,541 A | 6/1997 | Adam ......................... 428/198 |
| 5,652,048 A | 7/1997 | Haynes et al. .............. 442/351 |
| 5,656,361 A | 8/1997 | Vogt et al. .................. 428/198 |
| 5,681,963 A | 10/1997 | Liss ............................. 548/455 |
| 5,770,549 A | 6/1998 | Gross .......................... 510/238 |
| 5,783,692 A | 7/1998 | Kirby et al. ............. 536/123.1 |
| 5,858,504 A | * 1/1999 | Fitting ........................ 428/131 |
| 5,901,706 A | 5/1999 | Griesbach et al. .......... 128/849 |
| 6,107,268 A | * 8/2000 | Yahiaoui et al. ............ 510/438 |

FOREIGN PATENT DOCUMENTS

| | | |
|---|---|---|
| EP | 0 604 996 | 12/1993 |
| FR | 2353265 | 12/1977 |
| WO | 97/00738 | 1/1997 |
| WO | 97/34971 | 9/1997 |
| WO | 98/10134 | 3/1998 |
| WO | 99/05357 | 2/1999 |

OTHER PUBLICATIONS

Abstract of JP 01–192860.
Polymeric Transport Systems, "Microsponge 5645 Mineral Oil".
Polymeric Transport Systems, "Microsponge 5647 Glycerin".
Polymeric Transport Systems, "Polytrap 6035 Cyclomethicone".
Polymeric Transport Systems, "Polytrap 7100 Macro-Beads".
New Raw Materials, "Polymeric Controlled Release".
HAPPI Magazine, "Acrylates Copolymer: A Technique for Entrapping Cosmetic Actives," Jul. 1989.
CYTEC Industries, Inc., "Aerosol" 1990.

* cited by examiner

*Primary Examiner*—Cheryl Juska
*Assistant Examiner*—Jenna-Leigh Befumo
(74) *Attorney, Agent, or Firm*—Douglas H. Tulley, Jr.; Ralph H. Dean, Jr.

(57) ABSTRACT

A versatile sorbent material is provided comprising a fibrous sheet having applied thereto a wetting chemistry comprising (i) a poly glycoside; (ii) a fatty acid ester ethoxylate; and (iii) one or more surfactants selected from the group consisting of alkyl and aryl alcohol ethoxylates, alkyl sulfonates and sulfates, alcohol ether sulfates, alkyl phosphates and phosphonates, alkyl sulfosuccinates and sulfated fatty acid esters. A sorbent material is provided having excellent electrical resistivity and good absorption properties for a broad range of liquids including paraffin oil, water, sulfuric acid and sodium hydroxide.

23 Claims, 1 Drawing Sheet

MULTI-FUNCTIONAL SORBENT MATERIAL

This application claims priority from U.S. Provisional Application Ser. No. 60/087,384 filed on May 30, 1998.

FIELD OF THE INVENTION

The present invention relates to absorbent materials and, more particularly, the present invention relates to sorbent materials and wipes for industrial applications.

BACKGROUND OF THE INVENTION

Generally, industrial sorbent materials have been used heretofore to absorb or "pick-up" unwanted liquids that result from spills, leaks or other means. As an example, sorbent materials have been used as a means of collecting or absorbing oil and oil based liquids. Additionally, sorbent materials have likewise been used to collect or absorb aqueous liquids. As a specific example, sorbent materials have been used as floor mats in shops or mills to ensure that a working area does not become slippery or otherwise unsafe because of liquids spilled upon the floor. Sorbent wipes have also been used to remove undesirable liquids from workbenches and other surfaces. Further, sorbent materials have also been utilized as a means for retaining hazardous or environmentally unfriendly liquids, such as within an oil boom.

Sorbent materials desirably have a high absorption capacity since this allows for more efficient use of the sorbent material both in terms of the ability to use less material to absorb more liquids and in reducing the amount of saturated material for disposal. Disposal of wet sorbent material can be quite expensive where hazardous or environmentally unfriendly materials are absorbed since the disposal of sorbent material may require compliance with special and perhaps costly disposal protocols. In addition, the sorbent materials desirably exhibit the ability to quickly absorb or wick liquid into the article. Sorbent materials, particularly wipes, which do not quickly absorb liquids are not convenient to use when trying to clean up or remove liquids from a hard surface. Further, the sorbent material also desirably exhibits the ability to retain such liquids once wicked into the fabric. When sorbent materials cannot retain absorbed liquid they tend to leak or drip fluid once removed from the supporting medium. This can be disadvantageous in making clean up more difficult and/or by further spreading the undesirable liquids. Thus, sorbent materials that can quickly absorb significant quantities of liquids and which also have the ability to retain the same are highly desirable.

However, many sorbent materials inherently exhibit good absorption and retention characteristics for only certain types of liquids. For example, polyolefin nonwoven webs have heretofore been used to absorb oil or oil based liquids since polyolefin nonwoven wipes are inherently oleophillic and hydrophobic. Polyolefin nonwoven wipes need to be treated in some manner in order to impart good wetting characteristics or absorbency for water and other aqueous liquids. Thus, in order to improve the absorbency characteristics of sorbent articles, various wetting chemistries have been applied thereto. As an example, U.S. Pat. No. 4,328,279 to Meitner et al. discloses use of a low linting nonwoven web for use as a wipe in clean room applications. Polyolefin nonwoven wipes are inherently hydrophobic but by addition of a wetting chemistry, comprising an alkyl phenoxy ethanol and dioctyl sulfosuccinate, Meitner achieves a low linting sorbent material that exhibits good absorbent characteristics for both water and oil. Various other wetting chemistries have also been used in connection with sorbent materials to improve their absorbency characteristics. Therefore, when the composition of the liquid to be absorbed is known ahead of time, a suitable sorbent material can be selected for this specific purpose.

Research facilities, manufacturing facilities, repair shops, medical institutions and other entities often utilize or come in contact with a wide variety of chemicals or other compounds in their daily operations. Thus, the particular class or composition of the liquid sought to be absorbed can vary from day-to-day and even application-to-application. Moreover, the particular composition of liquids spilled or errantly released may be unknown to those with the responsibility to clean up or contain the same. However, as indicated above, many sorbent materials have good wicking and absorption characteristics only for certain specific liquids and do not exhibit adequate absorbency for other types of liquids. For example, a sorbent wipe may exhibit good affinity for oil based suspensions or emulsions and not for water. Further, with regard to aqueous liquids, the wipe may exhibit good absorbency characteristics for acidic aqueous liquids but not basic aqueous liquids and vice-versa. Thus, the problem often arises that for any given spill the sorbent material may be inefficient or entirely ineffective in absorbing and/or retaining that particular liquid.

In addition to absorbency, sorbent materials desirably have the ability to quickly dissipate charges since they are then less likely to develop or release a static charge. In this regard, sorbent materials used in proximity to electrically sensitive devices, such as integrated circuits and/or microelectronic devices, desirably have good anti-static properties. Although the current generated from static electricity is small by many standards, it is relatively large with respect to the electrical load intended to be carried by interconnection patterns within integrated circuits and other micro-electronic devices. Thus, static electricity can be fatally destructive to such devices. In addition, when collecting or containing flammable liquids it is likewise highly desirable that the web have excellent anti-static properties in order to avoid igniting the same. However, although anti-static properties are often desirable, use of conventional ionic compounds that impart anti-static properties can negatively impact emulsion stability, processability and absorbency characteristics of the sorbent material.

Therefore, there exists a need for a versatile sorbent material that has excellent absorbency characteristics, both in terms of rate and quantity, for a broad range of liquids having varied physical and chemical composition. Additionally, there exits a need for sorbent materials capable of absorbing both polar and non-polar liquids such as for example, both aqueous and hydrocarbon (i.e. oil) based solutions, emulsions and/or suspensions. Further, there exists a need for such a wiper capable of efficiently and effectively absorbing both highly acidic and basic liquids. Further, there exists a need for such a sorbent material having good anti-static properties. Still further, there exists a need for such sorbent materials that are stable (e.g. chemically and thermally) and that are capable of high-speed production.

SUMMARY OF THE INVENTION

The aforesaid needs are fulfilled and the problems experienced by those skilled in the art overcome by the sorbent materials of the present invention comprising a porous substrate having, upon its surface, a wetting chemistry comprising: a glycoside and/or a glycoside derivative; a fatty acid ester ethoxylate; and one or more surfactants selected from the group consisting of alkyl alcohol ethoxylates and halogenated analogs thereof, aryl alcohol ethoxylates and halogenated analogs thereof, alkyl sulfonates, alkyl sulfates, alcohol ether sulfates, alkyl phosphates and aryl analogs thereof, alkyl phosphonates and aryl analogs thereof, alkyl sulfosuccinates and/or sulfated fatty acid esters. The wetting chemistry is desirably located substantially throughout the porous substrate such as, for example, upon fiber surfaces throughout a nonwoven web. In a further aspect, the wetting chemistry desirably comprises about 0.1% to about 20% by weight of the sorbent material.

DEFINITIONS

Figure 1:
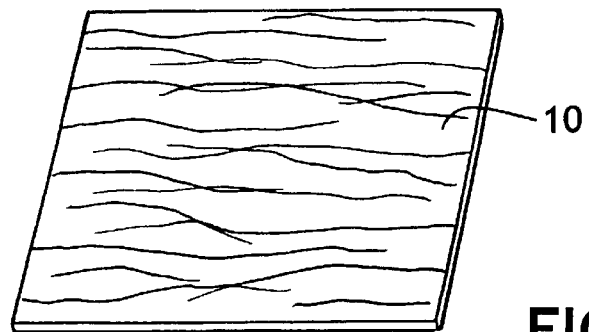
FIG. 1 is a perspective partially elevated view of a firous substrate suitable for use with the present invention.

As used herein, the term "comprising" is inclusive or open-ended and does not exclude additional unrecited elements, compositional components, or method steps.

As used herein, the term "sheet" refers to a layer of material that can be a woven material, knitted material, scrim, nonwoven web or other like material.

As used herein, the term "machine direction" or MD means the length of a fabric in the direction in which it is produced. The term "cross machine direction" or CD means the width of fabric, i.e. a direction generally perpendicular to the MD.

As used herein, the term "liquid" refers to liquids generally regardless of form and includes solutions, emulsions, suspensions and so forth.

DESCRIPTION OF THE INVENTION

The sorbent material of the present invention comprises a porous substrate having on the surface thereof a wetting chemistry comprising from (a) about 10% to about 80% (by weight) of a glycoside and/or a glycoside derivative; (b) about 10% to about 80% (by weight) of a fatty acid ester ethoxylate; (c) 0% to about 50% (by weight) of one or more surfactants selected from the group consisting of an alkyl alcohol ethoxylate, an aryl alcohol ethoxylate, a fluorinated analog of alkyl and aryl alcohol ethoxylates; and (d) between 0% to about 50% (by weight) of a surfactant selected from the group consisting of alkyl sulfonates, alkyl sulfates, alcohol ether sulfates, alkyl phosphates and aryl analogs thereof, alkyl phosphonates and aryl analogs thereof, alkyl sulfosuccinates and/or sulfated fatty acid esters. Desirably the wetting chemistry comprises a mixture of from (a) about 20% to about 60% (by weight) of a glycoside and/or a glycoside derivative; (b) about 20% to about 60% (by weight) of a fatty acid ester ethoxylate; (c) about 5% to about 30% (by weight) of one or more surfactants selected from the group consisting of an alkyl alcohol ethoxylate, an aryl alcohol ethoxylate, a halogenated analog of alkyl and aryl alcohol ethoxylates; and (d) about 5% and about 30% of one or more surfactants selected from the group consisting of alkyl sulfonates, alkyl sulfates, alcohol ether sulfates, alkyl phosphates and aryl analogs thereof, alkyl phosphonates and aryl analogs thereof, alkyl sulfosuccinates and/or sulfated fatty acid esters. Still more desirably, components (c) and (d) do not collectively comprise in excess of about 35% (by weight) of the wetting chemistry. In a particular embodiment of the invention, components (a):(b):(c):(d) are provided in a ratio of approximately 2:2:1:1 (by weight) respectively.

Suitable glycosides include both monoglycosides and polyglycosides. Desirably, however, the glycoside comprises an alkyl polyglycoside and even more desirably an alkyl polyglycoside having from about 8 to about 10 carbons in the alkyl chain. Exemplary alkyl glycosides and polyglycosides are disclosed in U.S. Pat. No. 5,385,750 to Aleksejczyk et al. and U.S. Pat. No. 5,770,549 to Gross, the entire contents of each of the aforesaid references are incorporated herein by reference. Alkyl polyglycosides are commercially available such as, for example, those sold under the trade names APG, GLUCOPON and PLANTAREN available from Henkel Corporation of Amber, Pa. An exemplary alkyl polyglycoside is a D-glucopyranoside having a $C_{10}$–$C_{16}$ alkyl substituent such as that offered by Henkel Corporation under the trade name GLUCOPON 600UP. An additional exemplary alkyl polyglycoside is octylpolyglycoside, such as that offered by Henkel Corporation under the trade name GLUCOPON 220UP, having a degree of polymerization of about 1.4 and the following chemical formula:

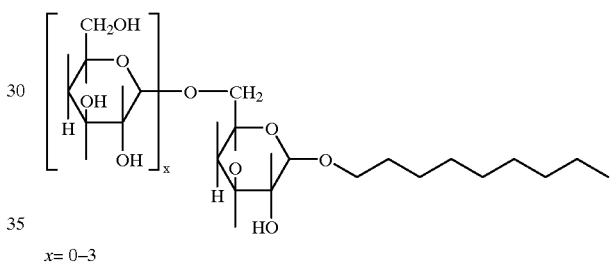

$x = 0–3$

With regard to component (b), it has been surprisingly found that utilization of a fatty acid ester ethoxylate interacts synergistically with one or more of the other components and thereby significantly enhancing the anti-static properties of the wetting chemistry and sorbent materials treated therewith. Fatty acid ester ethoxylates desirably include compounds having the following formula:

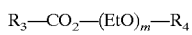

$R_3$—$CO_2$—$(EtO)_m$—$R_4$ where:
$R_3 = C_4$–$C_{22}$ alkyl and even more desirably about $C_8$–$C_{20}$ or $C_7$–$C_{16}$ alkyl phenyl;
$R_4 = C_1$–$C_{20}$ alkyl and even more desirably about $C_1$–$C_6$; and $m = 2–25$ and even more desirably about 3–15.

Desirably the third component comprises a poly(ethylene glycol) ester such as, for example, poly(ethylene glycol) monolaurate; poly(ethylene glycol) dioleate; poly(ethylene glycol) monooleate; poly(glycerol) monooleate and the like. A preferred material is a poly(ethylene glycol) monolaurate, which is commercially available from the Henkel Corporation under the trade name EMEREST 2650.

With regard to component (c), preferred alcohol ethoxylates desirably include those having the following formula:

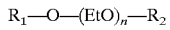

$R_1$—$O$—$(EtO)_n$—$R_2$ where:
$R_1$ = alkyl $C_4$–$C_{22}$ and even more desirably $C_8$–$C_{20}$ or alkyl phenyl $C_7$–$C_{22}$ and more desirably $C_9$–$C_{16}$;

$R_2$=alkyl $C_1$–$C_{10}$ and even more desirably $C_1$–$C_6$;

EtO=ethylene oxide n=2–25 and even more desirably 3–15

A suitable commercially available aryl alcohol ethoxylate is available from Union Carbide under the trade name TRITON such as, for example, TRITON X-102 which comprises an octyl phenol ethoxylate having approximately eleven ethylene oxide (EtO) units. Additionally, a particularly preferred alcohol ethoxylate comprises an aliphatic alcohol ethoxylate having from about five to about eighteen carbons in the alkyl chain. An exemplary commercially available aliphatic alcohol ethoxylate is available from ICI Surfactants under the trade name RENEX KB or SYNTHRAPOL KB which comprises polyoxyethylene decyl alcohol having an average of about 5.5 ethylene oxide (EtO) units.

With regard to component (d), exemplary surfactants include, but are not limited to, alkyl sulfates, alkyl sulfonates, alcohol ether sulfates, alkyl phosphate and aryl analogs thereof, alkyl phosphonate and aryl analogs thereof, alkyl sulfosuccinates, sulfated fatty acid esters, and the like. Commercially available alkyl sulfates are available from Henkel Corporation under the trade name SULFOTEX OA which comprises sodium 2-ethylhexyl sulfate and from ICI Surfactants under the trade designation G271 which comprises N-ethyl-N-soya morpholinium ethosulfate. In addition, alkylated sulfates such as sodium lauryl sulfates are also suitable for use in the present invention. Commercially available alkyl sulfonates, such as alkyl naphthalene sulfonate, are commercially available from Cytec Industries, Inc. under the trade name AEROSOL OS. In addition, sulfated surfactants also believed suitable for use with the present invention include alkyl sulfosuccinates such as, for example, sodium dioctyl sulfosuccinate, sodium dihexyl sulfosuccinate, sodium dicyclohexyl sulfosuccinate, disodium isodecyl sulfosuccinate and the like. Commercially available sodium dioctyl sulfosuccinate believed suitable for use with the present invention is available from Cytec Industries, Inc. under the trade name AEROSOL OT-75. Further, commercially available sulfated fatty acid esters are available from ICI Surfactants under the trade name CALSOLENE OIL HA which comprises a sulfated oleic acid ester.

In one embodiment, the sorbent material of the present invention can comprise a fibrous sheet having applied thereto a wetting chemistry comprising about 20% to 60% (by weight) of a polyglycoside; about 20% to 60% (by weight) of a fatty acid ester ethoxylate; and about 5% to 35% (by weight) of alkyl alcohol ethoxylate. In a further embodiment, the wetting chemistry can comprise about 20% to 60% (by weight) of a polyglycoside; about 20% and 60% of a fatty acid ester ethoxylate; about 5% to about 35% of alkyl alcohol ethoxylate; and about 5% to 35% of an alkyl sulfate and/or alkyl sulfonate. In an additional embodiment, the sorbent material can comprise a fibrous sheet having applied thereto a wetting chemistry comprising 20% to 60% (by weight) of a polyglycoside; about 20% to 60% (by weight) of a fatty acid ester ethoxylate; and about 5% to 35% (by weight) of an alkyl sulfate and/or alkyl sulfate.

Accordingly, sorbent materials of the present invention exhibit good absorption for oil-based liquids as well as water or other aqueous liquids. Additionally, sorbent materials of the present invention also exhibit good absorption for highly basic and acidic liquids. Further, the sorbent materials of the present invention have good absorbency characteristics for liquids of varied physical and chemical composition. More particularly, the sorbent materials of the present invention desirably have a Drop Test time of less than about 10 seconds, and even less than about 5 seconds, for the following liquids: paraffin oil; water; 75% $H_2SO_4$, 50% Nitric Acid and 30% NaOH. Still further, the sorbent materials can have a Drop Test time of less than about 10 seconds, and even less than about 5 seconds, for the following liquids: paraffin oil; water; 98% $H_2SO_4$, 70% Nitric Acid and 40% NaOH. Further, the sorbent material can have a Specific Capacity of at least about 8 grams oil per gram substrate and even more desirably has a Specific Capacity of at least about 11 grams oil per gram substrate. In addition to the aforesaid absorption characteristics, sorbent materials of the present invention can also exhibit excellent anti-static properties wherein the sorbent material has a Surface Resistivity or Electrical Resistivity less than about $1 \times 10^{14}$ ohms and even more desirably has a Surface Resistivity of about $1 \times 10^{11}$ ohms or less. The sorbent materials of the present invention can also exhibit a 90% Electrostatic Decay (the time it takes in seconds for the induced charge to dissipate to 10% of its original level) of less than about 0.5 second and even below about 0.1 second. Moreover, the versatile or multifunctional sorbent material provided herein can comprise entirely non-ionic components and/or components that are suitable for use in connection with clean room applications. Additional materials, which are compatible with and which do not substantially degrade the performance of the wetting chemistry, can optionally be added to the wetting chemistry described herein. As an example, additional components can include, but are not limited to the following: surface-active agents, dyes, pigments, fragrance, anti-bacterial agents, anti-fungal agents, odor control agents and so forth. Additional components can be added to the wetting chemistry as desired to impart additional desired characteristics to the sorbent material.

The wetting chemistry described herein can be utilized in conjunction with a wide variety of porous substrates. In reference to FIG. 1, a porous substrate 10 can comprise a fibrous sheet having numerous interstitial spaces throughout the same. Desirably the wetting chemistry is applied to a porous, durable substrate. Exemplary porous substrates include, but are not limited to, nonwoven webs, open cell foams, woven or knit materials and so forth. Desirably, however, the wetting chemistry is used in conjunction with a fibrous material such a nonwoven web. In a further aspect, the nonwoven web desirably comprises polyolefin fibers and even more desirably polypropylene fibers. As used herein the term "nonwoven" fabric or web means a web having a structure of individual fibers or threads which are interlaid, but not in an identifiable manner as in a knitted or woven fabric. Nonwoven fabrics or webs can be formed by many processes such as, for example, meltblowing processes, spunbonding processes, hydroentangling, air-laid and bonded carded web processes and so forth.

As a particular example, spunbond fiber webs are well suited for use in the present invention. Spunbond fiber webs having basis weighs from about 14 g/m² to about 120 g/m² and even more desirably from about 17 g/m² to about 68 g/m² are particularly well suited for use as sorbent materials ranging from hand wipes to floor mats. Methods of making suitable spunbond fiber webs include, but are not limited to, U.S. Pat. No. 4,340,563 to Appel et al.; U.S. Pat. No. 3,692,618 to Dorschner et al.; U.S. Pat. No. 3,802,817 to Matsuki et al.; U.S. Pat. Nos. 3,338,992 and 3,341,394 to Kinney; U.S. Pat. No. 3,502,763 to Hartman; U.S. Pat. No. 3,542,615 to Dobo et al.; U.S. Pat. No. 5,382,400 to Pike et al. and U.S. Pat. No. 5,759,926 to Pike et al. Crimped, high-loft multicomponent spunbond fiber webs, such as those described in U.S. Pat. No. 5,382,400 to Pike et al., are well suited for use in connection with the present invention; the entire content of the aforesaid patent is incorporated herein by reference.

As a further example, additional substrates suitable for use with the present invention include meltblown fiber webs. Meltblown fibers are generally formed by extruding a molten thermoplastic material through a plurality of die capillaries as molten threads or filaments into converging high velocity, usually hot, gas (e.g. air) streams which attenuate the filaments of molten thermoplastic material to reduce their diameter. Thereafter, the meltblown fibers can be carried by the high velocity gas stream and are deposited on a collecting surface to form a web of randomly dispersed meltblown fibers. Meltblown processes are disclosed, for example, in U.S. Pat. No. 3,849,241 to Butin et al.; U.S. Pat. No. 3,959,421 to Weber et al.; U.S. Pat. No. 5,652,048 to Haynes et al.; and U.S. Pat. No. 5,271,883 to Timmons et al. The meltblown fiber webs having high bulk and strength, such as those described in U.S. Pat. No. 5,652,048 to Haynes et al., are particularly well suited for use with the present invention; the entire content of the aforesaid patent is incorporated herein by reference. Meltblown fiber webs having a basis weight between about 17 $g/m^2$ and about 510 $g/m^2$, and more desirably between about 34 $g/m^2$ and about 450 $g/m^2$ gsm and still more desirably between about 68 $g/m^2$ and about 300 $g/m^2$, are particularly well suited for use as sorbent wipes or oilsorb materials.

As still a further example, the present invention can also be used in conjunction with multilayer laminates and other sorbent articles or devices. As used herein "multilayer laminate" means a laminate of two or more layers of material such as, for example, a spunbond/meltblown (SM) laminate; spunbond/meltblown/spunbond (SMS) laminate; spunbond/film (SF) laminate; meltblown/film laminate; etc. Examples of multilayer nonwoven laminates are disclosed in U.S. Pat. No. 4,041,203 to Brock et al. and U.S. Pat. No. 4,436,780 to Hotchkiss et al. and U.S. Pat. No. 4,906,513 to Kebbell et al.; the entire contents of each of the aforesaid references are incorporated herein by reference. The wetting chemistry described herein can be applied to one or more layers of the laminate as desired. By way of example only, additional composite materials, laminates and/or articles suitable for use with the present invention are also described in U.S. Pat. No. 5,281,463 to Cotton; U.S. Pat. No. 4,904,521 to Johnson et al.; U.S. Pat. No. 5,223,319 to Cotton et al.; U.S. Pat. No. 5,639,541 to Adam; U.S. Pat. No. 5,302,249 to Malhotra et al.; U.S. Pat. No. 4,659,609 to Lamers et al.; U.S. Pat. No. 5,249,854 to Currie et al. U.S. Pat. No. 4,100,324 to Anderson et al.; U.S. Pat. No. 5,350,624 to Georger et al. and U.S. Pat. No. 5,389,202 to Everhart et al. Although the present invention is discussed primarily in connection for use with absorbent wipes and/or mats for various industrial applications, one skilled in the art will appreciate that its usefulness is not limited to these particular applications.

The wetting chemistry can be applied to the substrate by any one of numerous methods known to those skilled in the art. Desirably the wetting chemistry is substantially uniformly applied throughout the substrate. One method for treating substrates is described herein below in reference to FIG. 2. Porous substrate 22, such as a nonwoven web, is unwound from supply roll 20 and travels in the direction of the arrows associated therewith. However, it will be appreciated that the porous substrate could be made in-line as opposed to being unwound from a supply roll. Porous substrate 22 is then passed under an applicator 24, such as a spray boom, wherein an aqueous liquid 26, containing the wetting chemistry, is applied or sprayed onto porous substrate 22. Vacuum 28 can, optionally, be positioned under porous substrate 22 in order to help draw aqueous liquid 26 through the web and improve the uniformity of treatment. Thereafter the porous substrate, with aqueous liquid 26 whereon, is optionally passed through dryer 27 as needed to drive off any remaining water. Upon driving off the water, the solids or wetting chemistry remains upon or in substrate 22 thereby providing sorbent material 23 which has improved absorbency characteristics. Desirably, the wetting chemistry comprises from about 0.2% to about 20% of the total weight of the dried sorbent material and even more desirably comprises about 0.3% to about 10% of the total weight of the dried sorbent material. Still more desirably, the wetting chemistry comprises an add-on weight of about 0.3% to about 5% of that of the weight of the substrate. The dried sorbent material 23 can then be wound on winding roll 29 (as shown) for subsequent use and/or conversion. Alternatively, dried sorbent material 23 can be converted immediately thereafter as desired.

Figure 2:
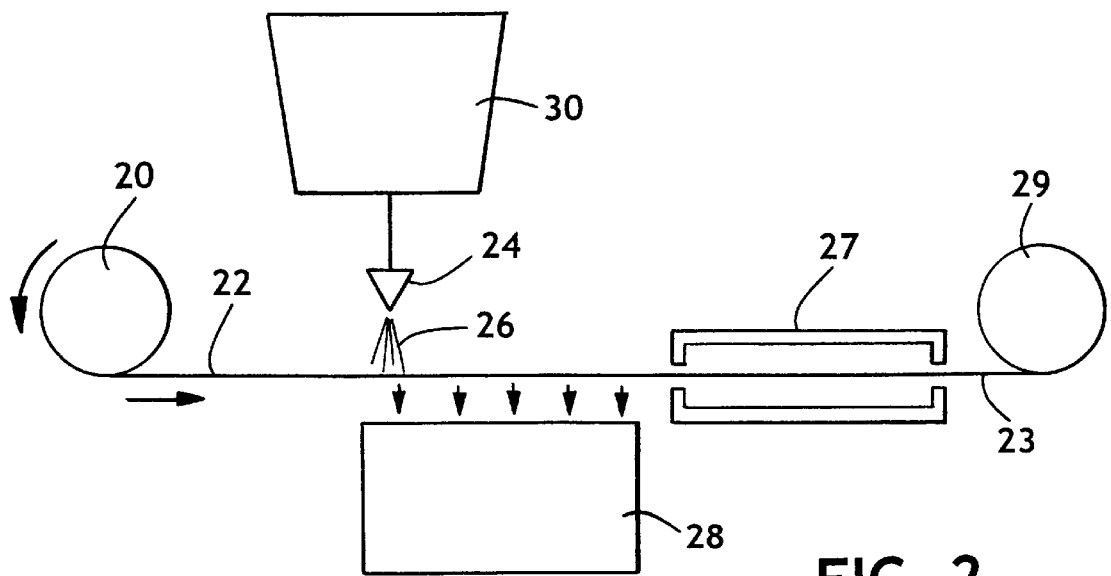
FIG. 2 is a schematic drawing of a process line for making sorbent materials of the present invention.

Still in reference to FIG. 2, aqueous liquid 26 can be provided from a tank or container 30. Aqueous emulsion or solution 26 desirably comprises from about 50% to about 99.5% (by weight) water and from about 0.5% to about 50% solids and more desirably about 97% water and about 3% solids. As used herein "solids" collectively refers to the sum combination of each of the components of the wetting chemistry described herein above. Use of higher weight percent solids offers improved efficiency in terms of the ability to use lower throughputs and thus reduced waste and improved drying. However, as the percent of solids increases so does the viscosity of the aqueous emulsion, which may make homogenous treatment of the porous substrate more difficult to achieve. Additionally, in order to avoid the use of preservatives and other like agents within the aqueous solution, just prior to treating the substrate, the aqueous solution can be heated to a temperature from about 40° C. to about 80° C., and more desirably to about 50° C., in order to prevent growth of bacteria or other undesirable organisms which may be present in the aqueous solution. However, in this regard it should be noted that if insufficient levels of co-surfactants are used, such as poly(ethylene glycol) ester and/or alkyl polyglycoside, the alcohol ethoxylate can phase separate upon heating.

Figure 3:
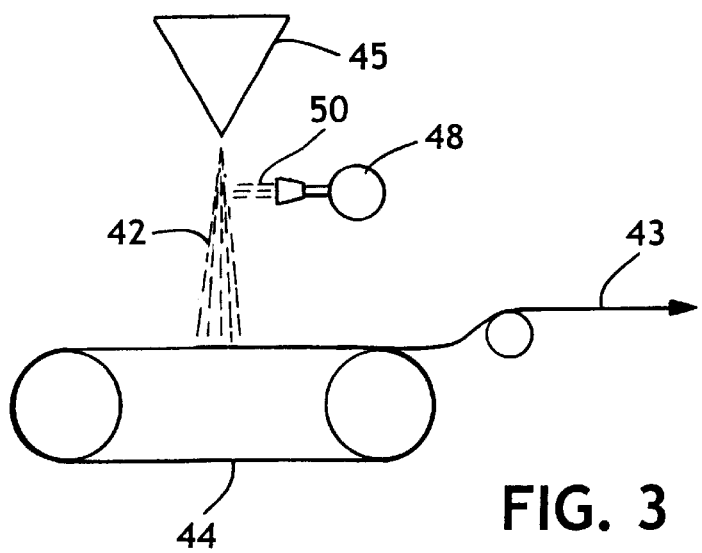
FIG. 3 a schematic drawing of a process line for making sorbent materials of the present invention.

In a further aspect, it is also possible to treat many of the porous substrates in-line. This may provide improved uniformity in treatment as well as aiding in drying of the substrate web. As an example, and in reference to FIG. 3, a meltblown fiber web 43 is made by depositing meltblown fibers 42 onto a forming wire 44. In this regard, meltblown fibers are blown from a series or bank of meltblown dies 45 onto a moving foraminous wire or belt 44. Spray booms 48 can be positioned adjacent each bank or series of meltblown dies 45 in order to spray blown fibers 42 with aqueous liquid 50 prior to formation of meltblown web 43 on the forming wire 44. The heat of the blown fibers causes most of the water to flash off leaving the wetting chemistry upon the fiber surfaces. Thus, a separate and additional drying step can be avoided. Additional methods of treating substrates are also suitable for use with the present invention such as, for example, "dip and squeeze" processes, brush coating processes and so forth.

Tests

Absorption Capacity: a 4 inch by 4 inch specimen is initially weighed. The weighed specimen is then soaked in a pan of test fluid (e.g. paraffin oil or water) for three minutes. The test fluid should be at least 2 inches (5.08 cm) deep in the pan. The specimen is removed from the test fluid and allowed to drain while hanging in a "diamond" shaped position (i.e. with one corner at the lowest point). The specimen is allowed to drain for three minutes for water and for 5 minutes for oil. After the allotted drain time the specimen is placed in a weighing dish and then weighed. Absorbency of acids or bases, having a viscosity more similar to water, are tested in accord with the procedure for testing absorption capacity of water. Absorption Capacity (g)=wet weight (g)–dry weight (g); and Specific Capacity (g/g)=Absorption Capacity(g)/dry weight (g). This test is more thoroughly described herein below.

Drop Test (for absorbency rate): A specimen is placed over the top of a stainless-steel beaker and covered with a template to hold the specimen in place. Using a pipette, at a right angle between 0.5 and 1 inch above the specimen, 0.5 ml liquid is dispensed onto the specimen. The timer is started simultaneously with the dispensing of the liquid onto the specimen. When the fluid is completely absorbed, the timer is stopped. The end point is reached when the fluid is absorbed to the point where light is not reflected from the surface of the liquid. The average of at least three tests is used to calculate the Drop Test time.

Electrostatic Decay: This test determines the electrostatic properties of a material by measuring the time required to dissipate a charge from the surface of the material. Except as specifically noted, this test is performed in accord with method 5930 of Federal Standard Test Method Standard No. 191A. Generally described, a 3.5 inch by 6.5 inch specimen is conditioned, including removal of any existing charge. The specimen is then placed in electrostatic decay testing equipment and charged to 5,000 volts. Once the specimen has accepted the charge, the charging voltage is removed and the electro des grounded. The time it takes for the sample to lose a pre-set amount of the charge (e.g. 50% or 90%) is recorded. The electrostatic decay times for the samples referenced herein were tested using calibrated static decay meter Model No. SDM 406C and 406D available from Electro-Tech Systems, Inc. of Glenside, Pa.

Electrical Resistivity (Surface Resistivity): This test measures the "resistivity" or opposition offered by a fabric to the passage through it of a steady electric current and quantifies the ease with which electric charges may be dissipated from a fabric. Surface Resistivity or Electrical Resistivity values reflect a fabric's ability to dissipate a charge and/or the tendency of a fabric to accumulate an electrostatic charge. Except as noted below, the test is performed in accord with INDA Standard Test Method: IST 40.1 (95). Generally described, a one by four inch specimen is placed between two electrodes spaced one inch apart such that the specimen and electrodes define a one inch square. A 100 volt direct current is then applied and the amount of current actually transmitted by the specimen is read on an electrometer. The data described herein was obtained using an electrometer such as Model 610C available from Keithley Instruments, Inc. of Cleveland, Ohio.

EXAMPLES

Example 1

An 11.5 ounce per square yard meltblown fabric comprising polypropylene fibers was formed having a wetting chemistry applied thereto. The wetting chemistry comprised a weight ratio of 1:1:0.6 of polyoxyethylene decyl alcohol: poly(ethylene glycol) monolaurate: octylpolyglycoside and had an add-on weight percent of 0.7%. The wetting chemistry was applied to the fibers in accord with the proces s generally described in reference to FIG. 3. The absorbency characteristics of the web was tested using the Drop Test, described herein above, for various fluids. The results are set forth in Table 1 below. The treated sorbent material had the following anti-static properties:

Surface Resistivity (Machine Direction, Face) $5.48 \times 10^{10}$ ohms

Surface Resistivity (Machine Direction, Anvil) $4.70 \times 10^{10}$ ohms

Electrostatic decay (50%, +Charge, Cross-Direction, Anvil) 0.043 seconds

Electrostatic decay (50%, +Charge, Cross-Direction, Face) 0.020 seconds

Electrostatic decay (50%, –Charge, Cross-Direction, Anvil) 0.037 seconds

Electrostatic decay (50%, –Charge, Cross-Direction, Face) 0.023 seconds

TABLE 1

| Test Chemical | Absorption Rate |
| --- | --- |
| Sodium Hydroxide (50%) | <1 Second |
| Sodium Hydroxide (30%) | <1 Second |
| Sulfuric Acid (98%) | 5 Seconds |
| Sulfuric Acid (50%) | 5 Seconds |
| Sulfuric Acid (30%) | <1 Second |
| Potassium Hydroxide (75%) | <1 Second |
| Potassium Hydroxide (50%) | <1 Second |
| Potassium Hydroxide (30%) | <1 Second |
| Nitric Acid (70%) | <1 Second |
| Nitric Acid (50%) | <1 Second |
| Nitric Acid (30%) | <1 Second |

Example 2

A 2 ounce per square yard fabric comprising polypropylene meltblown fibers was formed having a wetting chemistry applied thereto. The wetting chemistry comprised a 1:1:0.6 mixture (by weight) of polyoxyethylene decyl alcohol: poly(ethylene glycol) monolaurate: octylpolyglycoside. The weight percent add-on of the wetting chemistry and the results of a Drop Test for various fluids are set forth below in Table 2.

TABLE 2

| Absorption Time (sec.) of Different Chemicals (Drop Test) | | | | Weight Percent Add-On |
| --- | --- | --- | --- | --- |
| Water | 98% $H_2SO_4$ | 40% KOH | 40% NaOH | |
| <1 | 6 | 8 | 7 | 1% |
| <1 | 2 | 3 | 2 | 2% |

Example 3

A nonwoven web of polypropylene meltblown fibers was formed having a basis weight of approximately 34 g/m² a wetting chemistry applied thereto. The wetting chemistry comprised a 1:0.6:0.3 ratio (by weight) of poly(ethylene glycol) monolaurate: octylpolyglycoside: sodium lauryl sulfate. The weight percent add-on of the wetting chemistry was 1.9%. The treated nonwoven web had a Drop Test time of 1–2 seconds for 25% sodium hydroxide, 25 seconds for 40% sodium hydroxide, 2–3 seconds for 75% sulfuric acid, 3 seconds for 98% sulfuric acid and 1 second for water.

Example 4

A nonwoven web of polypropylene meltblown fibers was formed having a basis weight of approximately 34 g/m² a wetting chemistry applied thereto. The wetting chemistry comprised a 3.0:0.6:0.5:0.3 ratio (by weight) of poly (ethylene glycol) monolaurate: octylpolyglycoside: D-glucopyranoside: sodium lauryl sulfate. The weight percent add-on of the wetting chemistry was 1.9%. The treated nonwoven web had a Drop Test time of 3 seconds for 25% sodium hydroxide, 20 seconds for 40% sodium hydroxide, 3 seconds for 75% sulfuric acid, 5 seconds for 98% sulfuric acid and 1 second for water.

While various patents and other reference materials have been incorporated herein by reference, to the extent there is any inconsistency between incorporated material and that of the written specification, the written specification shall control. In addition, while the invention has been described in detail with respect to specific embodiments thereof, and particularly by the examples described herein, it will be apparent to those skilled in the art that various alterations, modifications and other changes may be made without departing from the spirit and scope of the present invention. It is therefore intended that all such modifications, alterations and other changes be encompassed by the claims.

What is claimed is:

1. A sorbent material comprising:
    a porous substrate selected from the group consisting of nonwoven webs, open cell foams, woven materials and knit materials; said substrate having a surface which has a wetting chemistry applied thereto;
    wherein the wetting chemistry comprises (i) a glycoside and/or a glycoside derivative and ii) a fatty acid ester ethoxylate; and (iii) an alcohol ethoxylate selected from the group consisting of alkyl alcohol ethoxylates, aryl alcohol ethoxylates, and halogenated analogs thereof and said sorbent material has a surface resistivity of less than $1\times10^{14}$ ohms and an absorption rate of less than 10 seconds for paraffin oil, water, 75% sulfuric acid and 30% sodium hydroxide.

2. The sorbent material of claim 1 wherein said porous substrate comprises a nonwoven web of polyolefin fibers and has a surface resistivity of less than about $1\times10^{11}$ ohms.

3. The sorbent material of claim 2 wherein said sorbent material has a 90% electrostatic decay less than 0.1 seconds.

4. The sorbent material of claim 2 wherein said sorbent material has an absorption rate of less than about 5 seconds for paraffin oil, water, 98% sulfuric acid and 30% sodium hydroxide.

5. The sorbent material of claim 4 wherein said porous substrate comprises a polyolefin fiber nonwoven web and has a specific capacity of at least about 8 grams oil per gram substrate.

6. The sorbent material of claim 5 wherein said sorbent material has an absorption rate of less than 10 seconds for 40% sodium hydroxide.

7. The sorbent material of claim 1 said wetting chemistry comprises from (i) about 20% to about 60%, by weight, of a glycoside and/or a glycoside derivative; (ii) about 20% to about 60%, by weight, of a fatty acid ester ethoxylate; and (iii) from about 5% to about 30%, by weight, of one or more surfactants selected from the group consisting of alkyl alcohol ethoxylates, aryl alcohol ethoxylates, and halogenated analog of alkyl and aryl alcohol ethoxylates and further comprises (iv) about 5% and about 30%, by weight, of one or more surfactants selected from the group consisting of alkyl sulfonates, alcohol ether sulfates, alkyl phosphates and aryl analogs thereof, and alkyl phosphonates and aryl analogs thereof.

8. The sorbent material of claim 1 wherein said wetting chemistry comprises about 0.1% to about 10% by weight of the sorbent material.

9. The sorbent material of claim 1 wherein said porous substrate comprises a nonwoven web.

10. The sorbent material of claim 9 wherein said nonwoven web comprises a polyolefin spunbond fiber web having a basis weight of at least about 17 g/m².

11. The sorbent material of claim 9 wherein said nonwoven web comprises a polyolefin meltblown fiber web having a basis weight of at least about 17 g/m².

12. The sorbent material of claim 1 wherein said porous substrate comprises a polyolefin nonwoven web and wherein said sorbent material has a specific capacity of at least 8 grams oil per gram substrate, and a surface resistivity of less than about $1\times10^{11}$ ohms.

13. The sorbent material of claim 7 wherein component (i) comprises an alkyl polyglycoside.

14. The sorbent material of claim 13 wherein component (ii) comprises a poly(ethylene glycol)ester.

15. The sorbent material of claim 13 wherein said wetting agent component (iii) comprises an aliphatic alcohol ethoxylate.

16. The sorbent material of claim 14 wherein said porous substrate comprises a polyolefin polymer nonwoven web selected from the group consisting of spunbond fiber webs, meltblown fiber webs, hydroentangled webs, staple fiber webs and multilayer laminates thereof wherein said sorbent material has a specific capacity of at least 8 grams oil per gram substrate, a surface resistivity of less than about $1\times10^{11}$ and an absorption rate of less than about 5 seconds for paraffin oil, water, 98% sulfuric acid and 40% sodium hydroxide.

17. The sorbent material of claim 1 wherein the wetting chemistry further comprises at least one member selected from the group consisting of surface-active agents, dyes, pigments, fragrances, anti-bacterial agents, anti-fungal agents and odor control agents.

18. A sorbent material comprising:
    a porous substrate selected from the group consisting of nonwoven webs, open cell foams, woven materials and knit materials; said substrate having a surface which has a wetting chemistry applied thereto;
    wherein said wetting chemistry comprises from (i) about 10% to about 80%, by weight, of a glycoside and/or a glycoside derivative; (ii) about 10 % to about 80%, by weight, of a fatty acid ester ethoxylate; and (iii) from 10% to about 80%, by weight, of one or more surfactants selected from the group consisting of alkyl alcohol ethoxylates and halogenated analogs thereof, aryl alcohol ethoxylates and halogenated analogs thereof, alkyl sulfonates, alcohol ether sulfates, alkyl phosphates and aryl analogs thereof, and alkyl phosphonates and aryl analogs thereof and said sorbent material has a surface resistivity of less than $1\times10^{14}$ ohms and an absorption rate of less than 10 seconds for paraffin oil, water, 75% sulfuric acid and 30% sodium hydroxide.

19. A sorbent material of claim 18, wherein said wetting chemistry comprises about 5% to about 35%, by weight, of component (iii).

20. The sorbent material of claim 18 wherein said wetting chemistry comprises about 0.1% to about 10% by weight of the sorbent material.

21. The sorbent material of claims 18 wherein said porous substrate comprises a nonwoven web of polyolefin fibers and has a surface resistivity of less than about $1\times10^{11}$ ohms.

22. The sorbent material of claim 18 wherein said porous substrate comprises a nonwoven polyolefin spunbond fiber web having a basis weight of at least about 17 g/m².

23. The sorbent material of claim 18 wherein said porous substrate comprises a nonwoven meltblown fiber web having a basis weight of at least about 17 g/m².

* * * * *